US010016736B2

(12) United States Patent
Pretz et al.

(10) Patent No.: US 10,016,736 B2
(45) Date of Patent: Jul. 10, 2018

(54) CYCLONIC REACTOR VESSEL HAVING A LOW RESIDENCE TIME PLENUM

(71) Applicant: Dow Global Technologies LLC, Midland, MI (US)

(72) Inventors: Matthew Pretz, Lake Jackson, TX (US); Don F. Shaw, Denville, NJ (US); Richard E. Walter, Long Valley, NJ (US)

(73) Assignee: Dow Global Technologies LLC, Midland, MI (US)

( * ) Notice: Subject to any disclaimer, the term of this patent is extended or adjusted under 35 U.S.C. 154(b) by 170 days.

(21) Appl. No.: 15/032,401

(22) PCT Filed: Sep. 22, 2014

(86) PCT No.: PCT/US2014/056737
§ 371 (c)(1),
(2) Date: Apr. 27, 2016

(87) PCT Pub. No.: WO2015/065618
PCT Pub. Date: May 7, 2015

(65) Prior Publication Data
US 2016/0256840 A1    Sep. 8, 2016

Related U.S. Application Data

(60) Provisional application No. 61/896,682, filed on Oct. 29, 2013.

(51) Int. Cl.
*B01J 8/18*        (2006.01)
*B04C 11/00*    (2006.01)
(Continued)

(52) U.S. Cl.
CPC .............. *B01J 7/00* (2013.01); *B01J 8/008* (2013.01); *B01J 8/0055* (2013.01); *B01J 8/18* (2013.01);
(Continued)

(58) Field of Classification Search
CPC ... B01J 7/00; B01J 8/0055; B01J 8/008; B01J 8/18; B04C 5/24; B04C 11/00
(Continued)

(56) References Cited

U.S. PATENT DOCUMENTS 2,985,516 A    5/1961  Trave et al.
3,563,911 A *  2/1971  Pfeiffer ..................... B01J 8/28
                                                            422/144

(Continued)

OTHER PUBLICATIONS

PCT Search Report dated Feb. 16, 2015; from PCT counterpart Application No. PCT/US2014/056737.
(Continued)

*Primary Examiner* — Huy Tram Nguyen
(74) *Attorney, Agent, or Firm* — Dinsmore & Shohl LLP

(57) ABSTRACT

A cyclonic reactor vessel comprising: a primary cyclonic separation device disposed within the shell and having an outlet; a plurality of secondary cyclones, said secondary cyclones being disposed within the shell, and each of said secondary cyclones having a body, an inlet and an outlet; wherein the outlet of the primary cyclonic separation device is connected to the inlet of at least one secondary cyclone; a first plenum having a skirt and a floor forming a sealed annular chamber within the shell; a second plenum having a smaller volume than a volume of the first plenum; and a secondary cyclone support system minimizing or eliminating mechanical thermal stresses; and wherein the outlets of the plurality of secondary cyclones are fluidly connected to the second plenum is provided.

9 Claims, 2 Drawing Sheets

(51) Int. Cl.
*B01J 7/00* (2006.01)
*B01J 8/00* (2006.01)
*B04C 5/24* (2006.01)

(52) U.S. Cl.
CPC ............... *B04C 5/24* (2013.01); *B04C 11/00* (2013.01); *B01J 2208/00557* (2013.01)

(58) Field of Classification Search
USPC ........................................................ 422/147
See application file for complete search history.

(56) References Cited

U.S. PATENT DOCUMENTS

| | | | | |
|---|---|---|---|---|
| 4,273,565 A | * | 6/1981 | Worley | B01D 45/12 248/317 |
| 4,547,341 A | * | 10/1985 | Weber | B01J 8/0055 248/317 |
| 4,579,716 A | | 4/1986 | Krumbeck et al. | |
| 4,624,772 A | * | 11/1986 | Krambeck | C10G 11/18 208/113 |
| 4,728,348 A | | 3/1988 | Nelson et al. | |
| 5,190,650 A | | 3/1993 | Tammera et al. | |
| 5,221,301 A | * | 6/1993 | Giuricich | B01D 45/12 422/147 |
| 5,275,641 A | | 1/1994 | Tammera et al. | |
| 5,740,834 A | * | 4/1998 | Sherowski | B01J 8/003 137/527.6 |
| 2011/0315603 A1 | | 12/2011 | Skoulidaset | |

OTHER PUBLICATIONS

IPRP dated May 12, 2016; from PCT counterpart Application No. PCT/US2014/056737.

EP Office Action dated Jun. 9, 2016; from EP counterpart Application No. 14782013.8.

\* cited by examiner

CYCLONIC REACTOR VESSEL HAVING A LOW RESIDENCE TIME PLENUM

FIELD OF INVENTION

The instant invention relates to a cyclonic reactor vessel having a low residence time plenum.

BACKGROUND OF THE INVENTION

In certain processes, such as dehydrogenation of alkanes or alkyl aromatics, it is important to minimize the residence time of the molecules at reaction temperature. In a fluidized reactor system, the fluidized catalyst and product gas must also be rapidly separated to avoid further degradation of the unreacted alkane or alkyl aromatics and the products produced. Fluidized reactor designs generally have gas residence time greater than 1 second. Such a long residence time could have a large impact on reaction yield. For example, a 1 second residence time in a propane dehydrogenation process at reaction temperature would cause a selectivity penalty of about 0.7 mol %. Attempts to minimize residence time must be balanced with the need for mechanical and thermal stability in supporting the cyclones at high temperatures which balances the thermal expansion within the system.

SUMMARY OF THE INVENTION

The instant invention is a cyclonic reactor vessel having a low residence time plenum.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
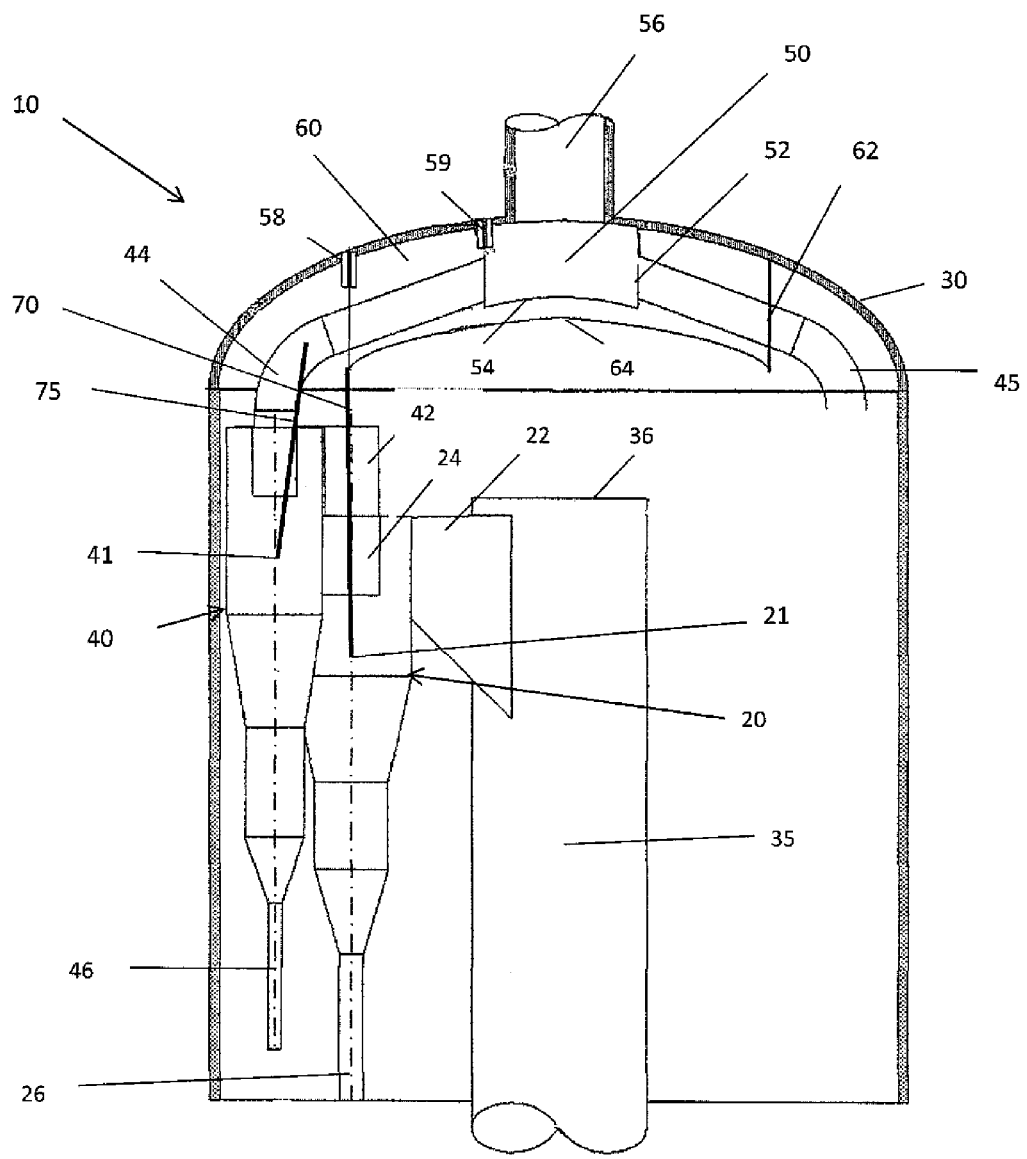
FIG. 1 is a schematic diagram of a first embodiment of the inventive cyclonic reactor vessel.

The instant invention is a cyclonic reactor vessel. The cyclonic reactor vessel according to the present invention comprises a shell; a primary cyclonic separation device disposed within the shell and having an outlet; a plurality of secondary cyclones, said secondary cyclones being disposed within the shell, and each of said secondary cyclones having a body, an inlet and an outlet; wherein the outlet of the primary cyclonic separation device fluidly connects to the inlet of at least one secondary cyclone; a first plenum having a skirt and a floor forming a sealed annular chamber within the shell, wherein the first plenum is supported within the shell by attachment to the shell; a second plenum having an outlet tube for removing gasses from within the shell, a skirt and a floor and having a smaller volume than a volume of the first plenum; wherein each of the secondary cyclones are supported from the first plenum by at least one of the following connections: (a) attachment of the outlet tube of each secondary cyclone to the skirt and/or floor of the first plenum and (b) a first set of hanger straps extending from the first plenum skirt and/or first plenum floor and/or secondary cyclone outlet pipe to the body of each secondary cyclone, wherein the first set of hanger straps are substantially vertically placed within the shell; and wherein the outlets of the plurality of secondary cyclones are fluidly connected to the second plenum.

As used herein, the term "the outlets of the plurality of secondary cyclones are fluidly connected to the second plenum" means that the outlets of the secondary cyclones allow passage of the effluent (fluid plus unseparated solids) from the secondary cyclones into the second plenum but that the outlets of the secondary cyclones are not mechanically attached to the second plenum. Such fluid connection prevents the secondary cyclone effluent from passing into an interior space formed by the shell and first plenum. Such fluid connection may be achieved for example by use of a sliding fit wherein a gap exists between the secondary cyclone outlets and the second plenum skirt. That the secondary cyclone outlets are mechanically decoupled from the second plenum avoids and/or minimizes stresses which could arise from differential thermal expansion.

Primary cyclonic separation devices are known in the art and include, for example, primary cyclones, and systems commercially available under the names VSS, $LD^2$, and $RS^2$. Primary cyclones are described, for example, in U.S. Pat. Nos. 4,579,716; 5,190,650; and 5,275,641. In some known separation systems utilizing primary cyclones as the primary cyclonic separation device one or more set of additional cyclones, e.g. secondary cyclones and tertiary cyclones, are employed for further separation of the catalyst from the product gas. It will be understood that any primary cyclonic separation device may be used in embodiments of the invention. In each case, effluent from the primary cyclonic separation device enters the secondary cyclones for further separation.

FIG. 1 illustrates an embodiment of the cyclonic reactor vessel 10 wherein the primary cyclonic separation device consists of at least one primary cyclone 20. The primary cyclone 20 is contained within a shell 30 and has a body 21, an inlet 22, an outlet 24 and a solids discharge dipleg 26. A fluidized solid stream enters the primary cyclone 20 through inlet 22. In the primary cyclone 20, a major part of entrained solids, e.g. catalyst particles, are separated from the fluidized solid stream. The separated solids exit the primary cyclone through discharge dipleg 26 leaving a primary cyclone effluent which comprises solids not removed by the primary cyclone and fluid, e.g. gaseous product. The primary cyclone effluent passes vertically upward and out of the primary cyclone 20 through outlet 24 and into the secondary cyclone(s) 40 through secondary cyclone inlet (s) 42. Secondary cyclone 40 further comprises a body 41, an outlet 44 and a solids discharge dipleg 46. The secondary cyclone 40 further separates out solids from the primary cyclone effluent. Solids separated out in the secondary cyclone 40 exit downward through dipleg 46. Secondary cyclone outlet 44 is fluidly connected to a second plenum 50. Second plenum 50 comprises a cylindrical skirt 52, a floor 54 and a second plenum outlet 56 which allows the secondary cyclone effluent to pass from the second plenum and out of the vessel 10. As shown in FIG. 1, the second plenum is housed within a larger, higher volume first plenum 60. First plenum 60 comprises a skirt 62 and a floor 64. Primary cyclone 20 is supported by the first plenum 60.

As shown in the embodiment illustrated in FIG. 1, the radius created by the radial centerlines (shown by a dashed vertical line) of the primary cyclones 20 of a symmetric cyclone system establishes the diameter of the first plenum. Such arrangement assists in minimizes or avoiding thermal stresses by allowing hanger straps 70 to be vertical within the shell. In another embodiment, the length of the skirt of the first plenum is determined to minimize the thermal stress associated with attachment to the shell relative to the high internal temperatures. In the embodiment shown in FIG. 1, one end of at least one first hanger strap 70 connects to the primary cyclone body 21, preferably on a radial centerline (shown by the dashed vertical line) and a second end of the first hanger strap 70 connects to floor 64 of the first plenum. Alternatively, the second end of the first hanger strap 70 could attach to the skirt 62 of the first plenum 60. It will be understood that in some embodiments a different type of primary cyclonic separation device may be used wherein such device need not be supported by the first plenum. For example, a VSS type primary cyclonic separation device may rest upon a floor of the shell.

Secondary cyclone 40 is held within and supported by the first plenum 60. In the embodiment shown in FIG. 1, one end of a second hanger strap 75 is connected to the body 41 of the secondary cyclone and a second end of the second hanger strap 75 is connected to the outlet 44 of the secondary cyclone 40. Alternatively, the second end of the second hanger strap 75 could attach to the floor 64 of the first plenum 60 or to the skirt 62 of the first plenum 60.

Each of the second hanger strap(s) 75 are aligned substantially vertically within the vessel. As used herein, substantially vertically means that the angle between the hanger strap and a plumb line suspended from the point of attachment of the hanger strap to the first plenum is equal to or less than 30°. All individual values and subranges from equal to or less than 30° are included herein and disclosed herein. For example, substantially vertically encompasses angles between the hanger strap and a plumb line suspended from the point of attachment of the hanger strap to the first plenum equal to or less than 30°, or in the alternative, equal to or less than 25°, or in the alternative, equal to or less than 20°, or in the alternative, equal to or less than 15°, or in the alternative, equal to or less than 10°. Preferably, the second hanger strap(s) 75 attach to the body 41 of the secondary at the radial centerline, shown by a shased vertical line, of the secondary cyclone.

Also shown in FIG. 1, the shell 30 further houses a riser 35. An unseparated stream of fluidized solid particles enters the shell through riser 35 which terminates in a plate 36. Riser 35 fluidly connects, i.e. allows passage of the fluidized solid particles, with the inlet 22 of the primary cyclone 20 such that the unseparated stream of fluidized solid particles may pass from the riser 35 into primary cyclone 20. If more than two cyclone stages are used, it is the effluent from the final cyclone stage which enters the second plenum. It will be understood that while FIG. 1 illustrates only one primary cyclone and one secondary cyclone, additional primary and secondary cyclones may be placed around the periphery of the riser. For example, outlet tube 45 could be connected to another secondary cyclone (not shown) which in turn is fed either by primary cyclone 20 or by another primary cyclone (not shown).

Still referring to FIG. 1, shell 30 is preferably constructed of a material capable of withstanding the operating conditions of the target processs, namely dehydrogenation of alkanes and/or alkyl aromatics. Such materials include, for example, refractory lined carbon steel for elevated temperatures in a propane dehydrogenation process. In one embodiment, the first plenum 60 is suspended from shell 30 by way of a stub 58 at the top of the first plenum skirt 62. The stub 58 is preferably constructed of the same material of construction as the shell 30. Second plenum 50 may also be attached to the shell 30 by way of a short stub 59 preferably constructed of the same material as the shell 30. The material of construction of the components inside the shell, e.g., primary cyclonic separator, riser, secondary cyclones and plena, is preferably selected for suitability of use with the temperature and pressure of the target process. For cases of catalytic dehydrogenation which operate at high temperatures, a material such as 304H stainless steel may be used. The interior surfaces of the secondary cyclone outlets and second plenum may be lined with a high abrasion resistant refractory system, such as AA22S or R-Max MP or Actchem 85.

Figure 2:
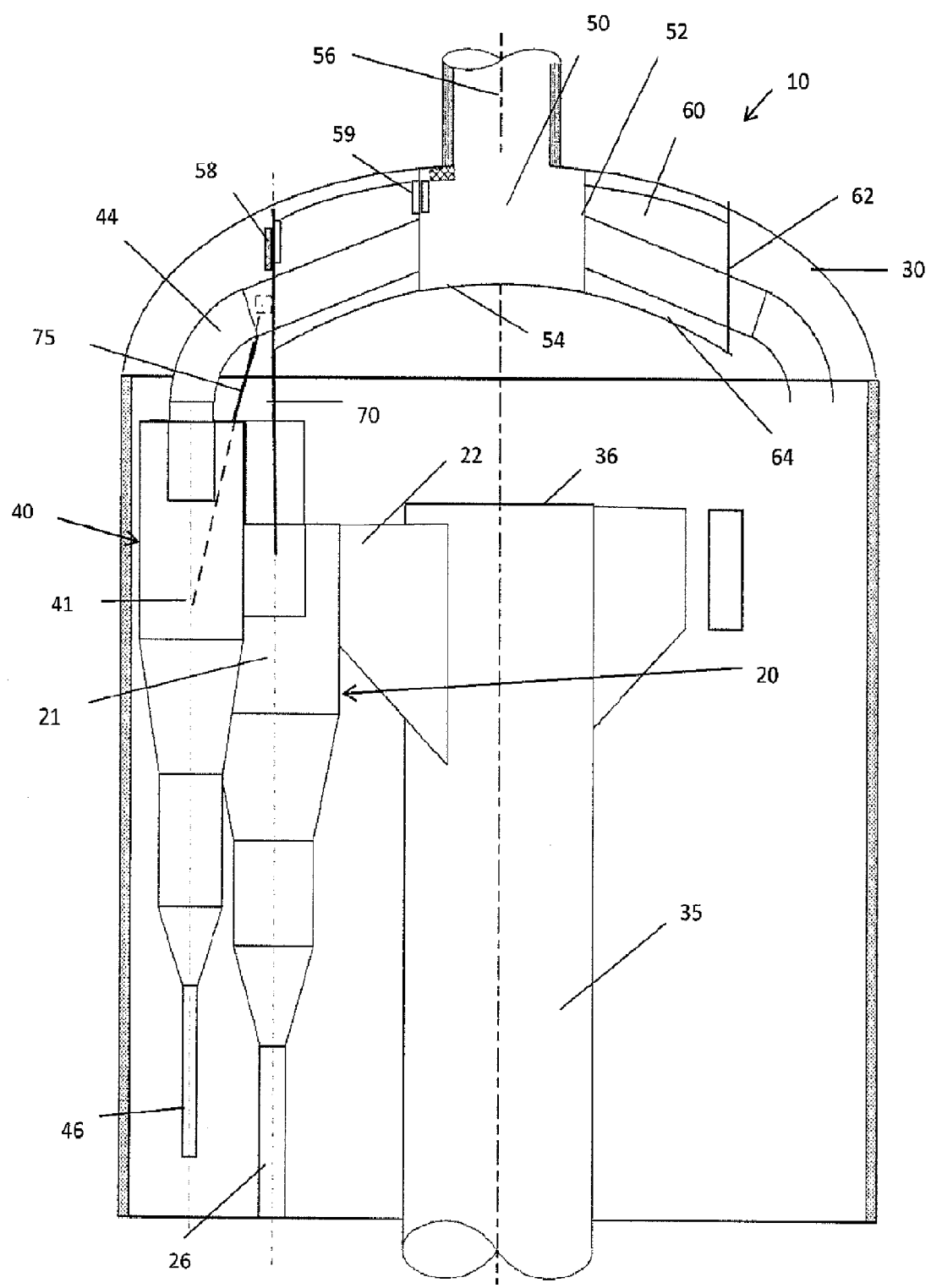
FIG. 2 is a schematic diagram of a second embodiment of the inventive cyclonic reactor vessel.

FIG. 2 shows an alternative embodiment in which the floor 54 of the second plenum 50 forms a portion of the floor 64 of the first plenum 60.

In an alternative embodiment, the instant invention is a cyclonic reactor vessel in accordance with any of the embodiments described herein, except that the primary cyclonic separation device comprises at least one primary cyclone, each primary cyclone having an inlet and an outlet.

In an alternative embodiment, the instant invention is a cyclonic reactor vessel in accordance with any of the embodiments described herein, except that each primary cyclone is attached to the skirt and/or floor of the first plenum by way of a second set of hanger straps and wherein the second set of hanger straps are substantially vertically placed.

In an alternative embodiment, the instant invention is a cyclonic reactor vessel in accordance with any of the embodiments described herein, except that the outlets of the secondary cyclones are connected to the second plenum by way of a sliding fit.

In an alternative embodiment, the instant invention is a cyclonic reactor vessel in accordance with any of the embodiments described herein, except that the first plenum further comprises an inlet to admit purge gas into an annular volume of the first plenum and an outlet to release the purge gas from the first plenum. In one embodiment, the purge gas releases from the first plenum into the second plenum through the sliding fit between the secondary cyclone outlet and the skirt of the second plenum. In a particular embodiment, the purge gas is selected from the group consisting of methane, hydrogen, product gas, steam and inert gasses.

In an alternative embodiment, the instant invention is a cyclonic reactor vessel in accordance with any of the embodiments described herein, except that the vessel is a fluidized bed reactor, riser reactor, fast fluidized reactor or turbulent bed reactor.

In an alternative embodiment, the instant invention is a cyclonic reactor vessel in accordance with any of the embodiments described herein, except that the vessel is a fluidized catalytic cracking reactor or regenerator.

In an alternative embodiment, the instant invention is a cyclonic reactor vessel in accordance with any of the embodiments described herein, except that the vessel is a gassifier.

In an alternative embodiment, the instant invention is a cyclonic reactor vessel in accordance with any of the embodiments described herein, except that the residence time of a gas in the second plenum is less than or equal to 0.4 seconds. All individual values and subranges from less than or equal 0.4 seconds are included herein and disclosed herein. For example, the residence time of a gas in the second plenum can range from an upper limit of 0.4; 0.35;

0.3; 0.25 or 0.2 seconds. The residence time of a gas in the second plenum can range from 0.05 to 0.4 seconds, or in the alternative, the residence time of a gas in the second plenum can range from 0.2 to 0.4 seconds, or in the alternative, the residence time of a gas in the second plenum can range from 0.3 to 0.4 seconds.

In an alternative embodiment, the instant invention is a cyclonic reactor vessel in accordance with any of the embodiments described herein, except that the second plenum is configured to dehydrogenate propane and a propylene selectively penalty from the entry to the outlet of the second plenum is equal to or less than 0.4 mole %. All individual values and subranges equal to or less than 0.4 mole % are included herein and disclosed herein. For example, the propylene selectivity penalty can range from an upper limit of 0.4; 0.35; 0.3; 0.25 or 0.2 mole %. For example, the propylene selectivity penalty can range from 0.1 to 0.4 mole %, or in the alternative, the propylene selectivity penalty can range from 0.2 to 0.4 mole %, or in the alternative, the propylene selectivity penalty can range from 0.25 to 0.35 mole %, or in the alternative, the propylene selectivity penalty can range from 0.3 to 0.4 mole %.

EXAMPLES

The following examples illustrate the present invention but are not intended to limit the scope of the invention. Inventive Example 1 is a model of a cyclonic reactor vessel comprising primary cyclones, secondary cyclones and a second plenum, according to the present invention for use in propane dehydrogenation.

Comparative Examples 1 and 2 are models of cyclonic reactor vessels comprising primary cyclones, secondary cyclones and solely a first plenum for propane dehydrogenation. Comparative Example 1 utilizes a beam style support system. In this design, the mechanical supports are beams with linkages. The linkages may coke up and result in mechanical problems i.e. thermal expansion is not balanced. Comparative Example 2 uses a plenum style support system that has no moving parts but has a long residence time as shown in Table 2.

Tables 1 and 2 provide the dimensions and volume for the second plenum and the lengths for the connecting pipes. Then the gas residence time in the second plenum and connecting pipes (for Inventive Example 1) are calculated. The dimensions and volume for the first plenum and gas residence times in the first plenum and inner connecting pipes (for Comparative Examples 1 and 2) as well as the propylene selectivity penalties for each example are calculated.

TABLE 1

| | Plenum Diameter (ft) | Plenum Area (ft$^2$) | Plenum Height (ft) | Plenum Volume (ft$^3$) | Differential Pipe Length (ft) | Vapor flow rate (ft$^3$/sec) |
|---|---|---|---|---|---|---|
| Inv. Ex. 1 | 8.5 | 56.7 | 5.0 | 283.6 | 12.0 | 3294 |
| Comp. Ex. 1 | 21.0 | 346.2 | 5.0 | 2077.1 | 8.0 | 3294 |
| Comp. Ex. 2 | 35 | 961.6 | 5.0 | 4808.1 | 0.0 | 3294 |

TABLE 2

| | Residence Time (seconds) | Propylene Selectivity Penalty (mole %) |
|---|---|---|
| Inv. Ex. 1 | 0.19 | 0.11 |
| Comp. Ex. 1 | 0.70 | 0.42 |
| Comp. Ex. 2 | 1.46 | 0.86 |

A model is used to illustrate the potential propylene selectivity achieved with the invention. Highly active and highly selective dehydrogenation catalysts are known. As an example, in PCT Publication No. WO20120711, Table 1 shows propane conversions around 37.6% with catalytic selectivities of 99.3 mol %. The experiments illustrated in WO20120711, Table 1 are conducted at 600° C. which is a temperature that exhibits very low gas phase reactions. WO20120711, Table 6, reproduced below as Table 3, is representative of the catalytic selectivity that a very active and highly selective catalyst would be expected to produce.

TABLE 3

| Number Of Cycles | C$_3$H$_8$ Conversion (%) | C$_3$H$_6$ Selectivity (%) |
|---|---|---|
| 1 | 41.8 | 99.4 |
| 2 | 38.1 | 99.3 |
| 5 | 37.9 | 99.3 |
| 8 | 37.6 | 99.2 |
| 10 | 37.6 | 99.3 |

Alternatively, PCT/US2012/046188, Table 9, partially reproduced as Table 4 below, shows a propane conversion of 46.1% with propane to propylene selectivity of 96.4% at 625° C. with the same catalyst. At 625° C., propane shows significantly more gas phase reaction which lowers the overall measured selectivity in the experiment. In order to show this, a simple model was developed as described in Table 5.

TABLE 4

| Example | C$_3$H$_8$ Conversion (%) | C$_3$H$_6$ Selectivity (%) |
|---|---|---|
| 6 | 46.1 | 96.4 |

TABLE 5

Catalytic and Gas Phase Propane → Propylene Selectivity Model

| Thermal Kinetics | | Units | Catalytic Reactor Lab |
|---|---|---|---|
| ln(a) | 33.18 | | |
| Ea/R | −33769.5 | | |
| | Propane Remaining | mol % | 100 |
| | Average Reaction Temperature | ° C. | 625 |
| | Residence Time | Seconds | 2 |
| | Catalytic Conversion | % | 44 |
| | Catalytic Selectivity | mol % | 99.3 |
| | Thermal Rate, k | mol/sec | 0.01197 |
| | Thermal Conversion | % | 2.4 |
| | Thermal Converted | % | 2.4 |
| | Thermal Selectivity | mol % | 45 |
| | Total Conversion | % | 46.4 |
| | Total Selectivity | mol % | 96.5 |

The catalytic selectivity is taken from Table 5 which shows a selectivity of 99.3 mol %. The thermal selectivity of propane is taken from "Thermal Cracking of Propane" in Kinetics and Product Distributions by Froment (1968), Page 440. The thermal reaction rate is calculated using the Arrenhius equation as shown below in Eqn. (1) using the Laider coefficients described by Froment in "Thermal Cracking of Propane."

$$k = Ae^{-E_a/(RT)} \quad (1)$$

The application of the Arrenhius equation is taken from the re-arrangement of Eqn. (1) as shown in Eqn (2) below. This allows the molar rate of reaction per second to be calculated, k.

$$\ln(k) = \frac{-E_a}{R}\frac{1}{T} + \ln(A) \quad (2)$$

The thermal reaction rate is then taken on the propane that is available at 45 mol % selectivity. The catalytic performance is solved for to achieve the measured total conversion. The resulting overall selectivity then should be close the measured value in the experiment. In this case, the model shows 96.5 mol % selectivity versus a measured 96.4 mol %.

The current invention is modeled with the methodology described above by combining the predicted catalytic performance in a catalytic reactor with the associated gas phase reaction kinetics. In Inventive Example 1, an additional 0.19 seconds in the secondary outlet pipes and the inner plenum results in a propylene selectivity loss of approximately 0.11 mol % on the overall propane to propylene reaction. Because this reaction is entirely in the gas phase, the incremental selectivity of the 0.1% conversation is 45 mol % which is the gas phase reaction selectivity. Table 6 illustrates the calculation for Inventive Example 1 herein.

TABLE 6

| Thermal Kinetics | Units | Reactor and Cyclones | Plenum |
|---|---|---|---|
| ln(a) | 33.18 | | |
| Ea/R | −33769.5 | | |
| Propane Remaining | mol % | 100 | 56.9 |
| Avg Reaction Temperature | C. | 620 | 620 |
| Residence Time | Sec | 5.9 | 0.19 |
| Catalytic Conversion | % | 37.58 | 0 |
| Catalytic Selectivity | mol % | 99.3 | 99.3 |
| Thermal Rate, k | mol/sec | 0.0097 | 0.00970 |
| Thermal Conversion | % | 5.6 | 0.18 |
| Thermal Converted | % | 5.6 | 0.10 |
| Thermal Selectivity | mol % | 45 | 45 |
| Total Conversion | % | 43.1 | 43.2 |
| Total Selectivity | mol % | 92.3 | 92.19 |
| Total Yield | mol % | | 39.9 |
| Selectivity Loss (Due to Plenum) | mol % | | 0.11 |
| Incremental Selectivity | mol % | | 45 |

Alternatively, if a single first plenum having the dimensions illustrated in Table 1 for Comparative Example 1 is used, in the absence of a smaller second plenum, with fluidly connected pipes, the residence time would be 0.51 seconds which would result in a 0.42 mol % selectivity penalty. Table 7 illustrates the calculation for Comparative Example 1.

TABLE 7

| Thermal Kinetics | Units | Reactor and Cyclones | Plenum |
|---|---|---|---|
| ln(a) | 33.18 | | |
| Ea/R | −33769.5 | | |
| Propane Remaining | mol % | 100 | 56.9 |
| Avg Reaction Temperature | C. | 620 | 620 |
| Residence Time | Sec | 5.9 | 0.70 |
| Catalytic Conversion | % | 37.58 | 0 |
| Catalytic Selectivity | mol % | 99.3 | 99.3 |
| Thermal Rate, k | mol/sec | 0.0097 | 0.00970 |
| Thermal Conversion | % | 5.6 | 0.68 |
| Thermal Converted | % | 5.6 | 0.38 |
| Thermal Selectivity | mol % | 45 | 45 |
| Total Conversion | % | 43.1 | 43.5 |
| Total Selectivity | mol % | 92.3 | 91.88 |
| Total Yield | mol % | | 40.0 |
| Selectivity Loss (Due to Plenum) | mol % | | 0.42 |
| Incremental Selectivity | mol % | | 45 |

Finally, if a single first plenum having the dimensions illustrated in Table 1 for Comparative Example 2 is used, in the absence of a smaller second plenum, with fluidly connected pipes has a residence time would be 1.46 second which would result in a 0.86 mol % propylene selectivity penalty. Table 8 illustrates the calculation for Comparative Example 2.

TABLE 8

| Thermal Kinetics | Units | Reactor and Cyclones | Plenum |
|---|---|---|---|
| ln(a) | 33.18 | | |
| Ea/R | −33769.5 | | |
| Propane Remaining | mol % | 100 | 56.9 |
| Avg Reaction Temperature | C. | 620 | 620 |
| Residence Time | Sec | 5.9 | 1.46 |
| Catalytic Conversion | % | 37.58 | 0 |
| Catalytic Selectivity | mol % | 99.3 | 99.3 |
| Thermal Rate, k | mol/sec | 0.0097 | 0.00970 |
| Thermal Conversion | % | 5.6 | 1.41 |
| Thermal Converted | % | 5.6 | 0.80 |
| Thermal Selectivity | mol % | 45 | 45 |
| Total Conversion | % | 43.1 | 43.9 |
| Total Selectivity | mol % | 92.3 | 91.44 |
| Total Yield | mol % | | 40.2 |
| Selectivity Loss (Due to Plenum) | mol % | | 0.86 |
| Incremental Selectivity | mol % | | 45 |

The present invention may be embodied in other forms without departing from the spirit and the essential attributes thereof, and, accordingly, reference should be made to the appended claims, rather than to the foregoing specification, as indicating the scope of the invention.

We claim:

1. A cyclonic reactor vessel comprising:
   a shell;
   a primary cyclonic separation device disposed within the shell and having an outlet;
   a plurality of secondary cyclones, said secondary cyclones being disposed within the shell, and each of said secondary cyclones having a body, an inlet and an outlet; wherein the outlet of the primary cyclonic separation device is connected to the inlet of at least one secondary cyclone such that a fluid stream may flow from the outlet of the primary cyclonic separation device into the inlet of the at least one secondary cyclone;
   a first plenum having a skirt and a floor forming a sealed annular chamber within the shell, wherein the first plenum is supported within the shell by attachment to the shell;
   a second plenum having an outlet tube for removing gasses from within the shell, a skirt and a floor and having a smaller volume than a volume of the first plenum; and
   a secondary cyclone support system comprising at least one mechanism selected from the group consisting of: (a) attachment of the outlet tube of each secondary cyclone to the skirt and/or floor of the first plenum and (b) a first set of hanger straps extending from the first plenum skirt and/or first plenum floor and/or secondary cyclone outlet pipe to the body of each secondary cyclone, wherein the first set of hanger straps are substantially vertically placed within the shell; and
   wherein the outlets of the plurality of secondary cyclones are fluidly connected to the second plenum.

2. The cyclonic reactor vessel according to claim 1, wherein the secondary cyclone support system minimizes mechanical thermal stresses between the first and second plenums and the secondary cyclones.

3. The vessel according to claim 1, wherein the primary cyclonic separation device comprises at least one primary cyclone, each primary cyclone having an inlet and an outlet.

4. The vessel according to claim 3, wherein each primary cyclone is attached to the skirt and/or floor of the first plenum by way of a second set of hanger straps and wherein the second set of hanger straps are substantially vertically.

5. The vessel according to claim 1, wherein the outlets of the secondary cyclones are connected to the second plenum by way of a sliding fit.

6. The vessel according to claim 1, wherein the first plenum further comprises a purge gas inlet.

7. The vessel according to claim 1, wherein the vessel is selected from the group consisting of fluidized bed reactors, riser reactors, fast fluidized reactors, turbulent bed reactors, fluidized catalytic cracking reactors, fluidized catalytic cracking regenerators and gassifiers.

8. The vessel according to claim 1, wherein the residence time of a gas in the second plenum is less than or equal to 0.4 seconds.

9. The vessel according to claim 7, wherein the second plenum is configured to dehydrogenate propane and a propylene selectively penalty from the entry to the outlet of the second plenum is equal to or less than 0.4 mole %.

* * * * *

UNITED STATES PATENT AND TRADEMARK OFFICE
CERTIFICATE OF CORRECTION

PATENT NO. : 10,016,736 B2
APPLICATION NO. : 15/032401
DATED : July 10, 2018
INVENTOR(S) : Matthew Pretz, Don F. Shaw and Richard E. Walter Page 1 of 1

It is certified that error appears in the above-identified patent and that said Letters Patent is hereby corrected as shown below:

In the Claims

Column 10, Line 13, Claim 4:
"the second set of hanger straps are substantially vertically."
Should read:
--the second set of hanger straps are substantially vertical.--; and Column 10, Line 29, Claim 9:
"pylene selectively penalty from the entry to the outlet of the"
Should read:
--pylene selectivity penalty from the entry to the outlet of the--.

Signed and Sealed this
Fifth Day of February, 2019

Andrei Iancu
*Director of the United States Patent and Trademark Office*